United States Patent
Friedman et al.

(10) Patent No.: US 9,497,080 B1
(45) Date of Patent: Nov. 15, 2016

(54) ELECTION AND USE OF CONFIGURATION MANAGER

(71) Applicant: International Business Machines Corporation, Armonk, NY (US)

(72) Inventors: Alex Friedman, Hadera (IL); Constantine Gavrilov, Rishon-le-Zion (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/078,080

(22) Filed: Mar. 23, 2016

Related U.S. Application Data

(63) Continuation of application No. 14/862,255, filed on Sep. 23, 2015.

(51) Int. Cl.
  *G06F 15/177* (2006.01)
  *H04L 12/24* (2006.01)

(52) U.S. Cl.
  CPC ......... *H04L 41/0816* (2013.01); *H04L 41/042* (2013.01)

(58) Field of Classification Search
  None
  See application file for complete search history.

(56) References Cited

U.S. PATENT DOCUMENTS

| | | |
|---|---|---|
| 7,010,607 B1 | 3/2006 | Bunton |
| 7,421,488 B2 | 9/2008 | Elko et al. |
| 7,653,769 B2 | 1/2010 | Fisher et al. |
| 7,843,962 B2 | 11/2010 | Gunthorpe et al. |
| 8,429,630 B2 | 4/2013 | Nickolov et al. |
| 8,578,076 B2 | 11/2013 | Van Der Linden et al. |
| 9,210,100 B2 | 12/2015 | Van Der Linden et al. |
| 9,219,718 B2 | 12/2015 | Johnsen et al. |
| 2003/0005039 A1 | 1/2003 | Craddock et al. |
| 2004/0054828 A1 | 3/2004 | Finch |
| 2004/0190546 A1 | 9/2004 | Jackson |
| 2005/0038883 A1* | 2/2005 | Elko ............... H04L 41/044 709/223 |
| 2008/0144531 A1* | 6/2008 | Fisher ............. A61K 48/005 370/255 |
| 2008/0201403 A1* | 8/2008 | Andersson ......... H04L 45/02 709/202 |
| 2009/0276771 A1 | 11/2009 | Nickolov et al. |
| 2010/0274943 A1* | 10/2010 | Mahadevan ........ G06F 13/385 710/316 |
| 2011/0022812 A1 | 1/2011 | Van Der Linden et al. |
| 2011/0274010 A1 | 11/2011 | Kwon et al. |
| 2012/0079090 A1 | 3/2012 | Johnsen et al. |
| 2013/0051222 A1 | 2/2013 | Gavrilov et al. |
| 2013/0054947 A1 | 2/2013 | Gavrilov |
| 2013/0262937 A1 | 10/2013 | Sridharan et al. |
| 2013/0301646 A1 | 11/2013 | Bogdanski et al. |
| 2014/0040343 A1 | 2/2014 | Nickolov et al. |
| 2014/0052864 A1 | 2/2014 | Van Der Linden et al. |

(Continued)

OTHER PUBLICATIONS

Vishnu, et al.;"Performance Modeling of Subnet Management on Fat Tree InfiniBand Networks using OpenSM"; Proceedings of the 19th IEEE International Parallel and Distributed Processing Symposium (IPDPS'05); 2005; pp. 1-8; IEEE Computer Society.

(Continued)

*Primary Examiner* — Thomas Dailey
(74) *Attorney, Agent, or Firm* — Olivia R. Scheuer

(57) ABSTRACT

In an approach for election of a manger for a network, a processor detects that a first set of management tasks is not running. A processor identifies at least a first node in a network and information about the first node. A processor determines that the first node is capable of performing the first set of management tasks based on the information about the first node. A processor elects the first node as a manager in the network to perform the first set of management tasks.

1 Claim, 7 Drawing Sheets

(56) References Cited

U.S. PATENT DOCUMENTS

| | | | |
|---|---|---|---|
| 2014/0105029 A1* | 4/2014 | Jain | H04L 43/0811 370/242 |
| 2014/0269720 A1 | 9/2014 | Srinivasan | |
| 2014/0281462 A1 | 9/2014 | Friedman et al. | |

OTHER PUBLICATIONS

IBM; "Driving performance with the IBM XIV Storage System"; IBM Systems and Technology; White Paper; Copyright IBM Corporation 2013; Apr. 2013; pp. 1-15.

IBM; "Low Cost Method for Implementing an InfiniBand Linear Forwarding Table"; ip.com; ip.com No. 000133316; Jan. 23, 2006; pp. 1-3.

Kashyap; "IP over InfiniBand (IPoIB) Architecture (RFC4392)"; ip.com; Original Publication Date: Apr. 1, 2006; ip. com No. 000135266; ip.com Electronic Publication date: Apr. 8, 2006. pp. 1-23; Copyright © The Internet Society (2006).

"A self-configuring network"; ip.com; ip.com No. 000007386; Mar. 20, 2002; 1 page.

"Method and System for Network Self Healing using Network Intelligence"; ip.com; ip.com No. 000219386; Jun. 27, 2012; pp. 1-11.

"Method for Topology Independent Path Determination in InfiniBand Subnets"; ip.com; ip.com No. 000012791; May 28, 2003; 6 pages.

Appendix P: List of IBM Patents or Patent Applications Treated as Related; Dated Apr. 26, 2016; 2 pages.

U. S. Appl. No. 14/862,235, filed Sep. 23, 2015; Entitled "Distributed Subnet Manager for Infiniband Networks".

U. S. Appl. No. 15/078,018, filed Mar. 23, 2016; Entitled "Distributed Subnet Manager for Infiniband Networks".

U. S. Appl. No. 14/862,255, filed Sep. 23, 2015; Entitled "Election and Use of Configuration Manager".

U.S. Appl. No. 14/862,309, filed Sep. 23, 2015; Entitled "Cooperative Mkey Locking for Managing Infiniband Networks".

* cited by examiner

ELECTION AND USE OF CONFIGURATION MANAGER

BACKGROUND

The present invention relates generally to the field of configuring Infiniband networks, and more particularly to the electing and use of a manager that controls the configuration of an Infiniband network.

InfiniBand® is an industry-standard specification that defines and input/output architecture used to interconnect servers, communications infrastructure equipment, storage and embedded systems. InfiniBand® is a computer network communications connection used in high-performance computing featuring very high throughput and very low latency. InfiniBand® is used for data interconnect both among and within computers. InfiniBand® is a commonly used interconnect in supercomputers. InfiniBand® is a type of communications connection for data flow between processors and I/O devices that offers throughput of up to 56 gigabytes per second and supports for up to 64,000 addressable devices.

The internal data flow system in most personal computers (PCs) and server systems is inflexible and relatively slow. As the amount of data coming into and flowing between components in the computer increases, the existing bus system becomes a bottleneck. Instead of sending data in parallel (typically 32 bits at a time, but in some computers 64 bits) across the backplane bus, InfiniBand® specifies a serial (bit-at-a-time) bus. Fewer pins and other electrical connections are required, saving manufacturing cost and improving reliability. The serial bus can carry multiple channels of data at the same time in a multiplexing signal. InfiniBand® also supports multiple memory areas, each of which may be addressed by both processors and storage devices.

With InfiniBand®, data is transmitted in packets that together form a communication called a message. A message can be a remote direct memory access (RDMA) read or write operation, a channel send or receive message, a reversible transaction-based operation or a multicast transmission. Similar to the channel model many mainframe users are familiar with, a transmission or a message begins or ends with a channel adapter. Each processor has what is called a host channel adapter (HCA) and each peripheral device has a target channel adapter (TCA). HCAs are I/O engines located within a server. TCAs enable remote storage and network connectivity into the InfiniBand® interconnect infrastructure, called a fabric.

Infiniband® links have physical and logical state properties. The physical property of the link is negotiated in hardware. The logical state of the link is managed by software. When physical link goes up, the logical state of the link is not active. There is no address assigned to the port, and applications cannot communicate with the port using arbitrary data protocols. A possible communication is done by sending and receiving subnet management protocol (hereinafter SMP) Unicast datagrams (hereinafter UD), which are used to discover and configure the network. Infiniband® networks require a subnet manager software entity running on one of the nodes.

The Subnet Manager uses SMP datagrams to discover and configure the network. The discovery is done via direct route (by specifying each hop of source-to-destination path) and does not require switch routing. The task of the Subnet Manager is to discover the fabric, assign LID addresses to each end-point, configure switch routing tables and put each end-point to logical Active state. The Subnet Manager is also responsible for removing the no longer present end-points from the routing tables, and answering subnet administration (hereinafter SA) queries, which perform operations on its internal tables and do multicast management. Once Subnet Manager brings the end-point to Active state, the end-point can exchange data with other end-points in the fabric in Active state.

The Subnet Manager standard is covered in Infiniband® Architecture Specification. Existing standard assumes a single Subnet Manager in master role in the fabric and does not cover dynamic distributed configuration management (where configuration is supplied externally and shall be distributed to configuration manager). Enforcing expected configuration within a network cluster by subnet manager becomes a challenge since propagation of expected configuration and election of a configuration manager is not possible before network is operational. Furthermore, if configuration manager node fails to receive a configuration update or is considered failed by other nodes on the cluster, it will not have an up-to-date configuration and enforcing such configuration may break the network connectivity.

SUMMARY

Aspects of an embodiment of the present invention disclose a method, computer program product, and a computer system for election of a manger for a network. A processor detects that a first set of management tasks is not running. A processor identifies at least a first node in a network and information about the first node. A processor determines that the first node is capable of performing the first set of management tasks based on the information about the first node. A processor elects the first node as a manager in the network to perform the first set of management tasks.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module", or "system." Furthermore, aspects of the present invention may take the form of a computer program product embodied in one or more computer readable medium(s) having computer readable program code/instructions embodied thereon.

Embodiments of the present invention recognize that there are many different methods and standards for electing and using a manager that controls the configuration within a network. Embodiments of the present invention disclose an approach to elect a manager that controls the configuration within the network and also the tasks performed by the configuration manager within a network. An approach allows enforcing configuration in a way that does not break network connectivity and prevents failed or run-away nodes to enforce stale configuration.

Embodiments of the present invention disclose a method, computer program product, and computer system, to provide a process electing a manager that controls the configuration within the network and also the tasks performed by the configuration manager within a network. Embodiments of the present invention allow enforcing a configuration in a way that does not break network connectivity and prevents failed or run-away nodes to enforce stale configuration.

The present invention will now be described in detail with reference to the Figures.

Figure 1:
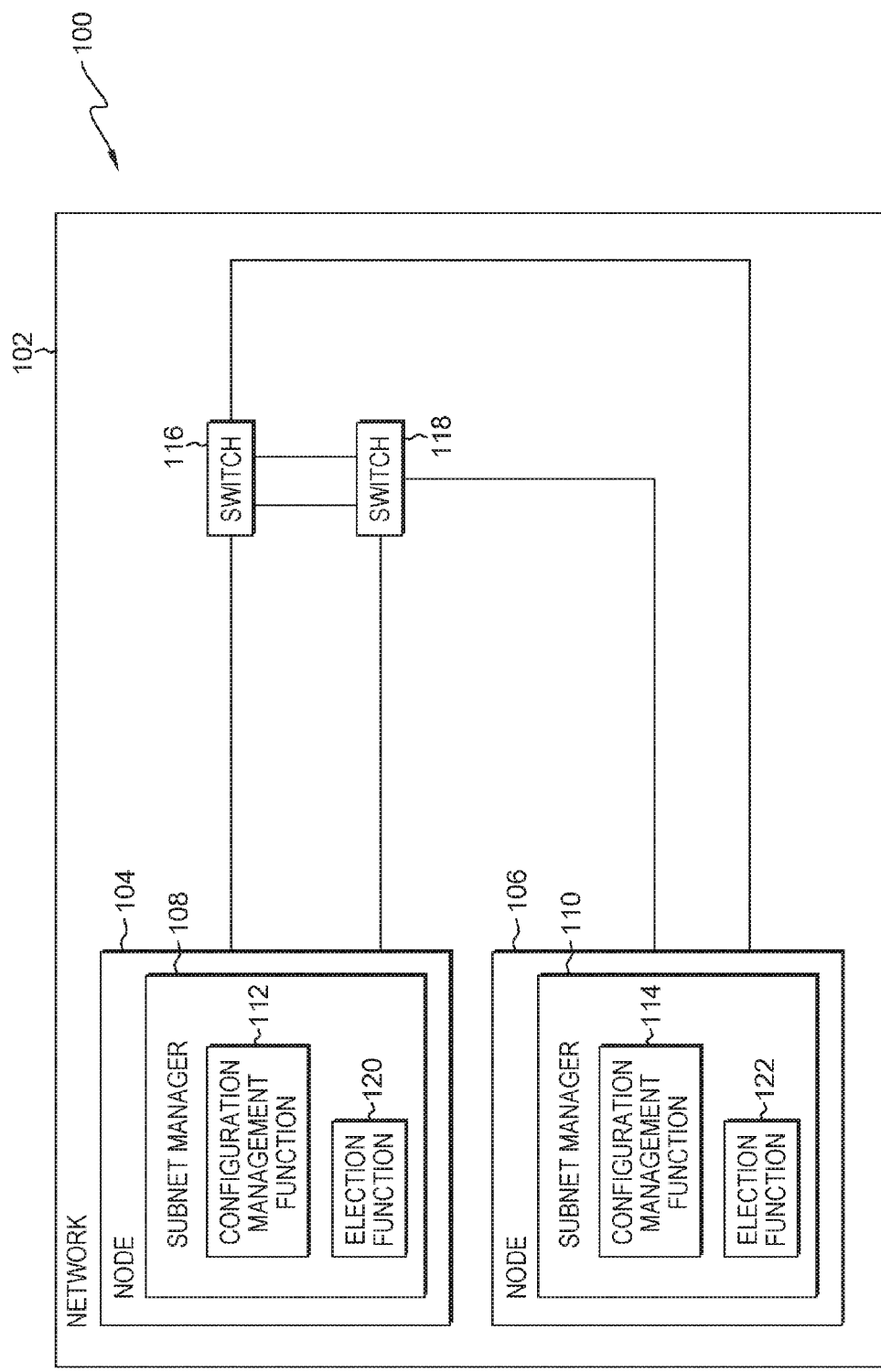
FIG. 1 depicts a block diagram of a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to, network 102, node 104 and node 106, switch 116 and switch 118. Computing environment 100 may include additional computing devices, servers, computers, switches, or other devices not shown. It should be appreciated by one skilled in the art that FIG. 1 provides only an illustration of one implementation and does not imply any limitations with regard to the environments in which different embodiments may be implemented. Many modifications to the depicted environment may be made.

Network 102 may be a local area network (LAN), a wide area network (WAN) such as the Internet, any combination thereof, or any combination of connections and protocols which support communications between node 104 and node 106, switch 116 and switch 118. Network 102 maybe a subnet, or other type of networks which are embedded in a larger system. In one embodiment, network 102 is an Infiniband® network. Network 102 may include wired, wireless, or fiber optic connections. Network 102 provides a network for nodes 104, node 106, switch 116, and switch 118 to communicate with one another without the significant overhead of an operating system. Additionally, network 102 allows nodes 104 and 106 to discover and configure the network fabric.

Node 104 and node 106 each can be a source or destination in communication. Node 104 and node 106 are substantially similar to one another. A communication can be a message, data, or other information which is sent from one location (e.g., a source) to a next location (e.g., a destination) in computing environment 100. Nodes 104 and 106 may be a desktop computer, laptop computer, tablet computer, netbook computer, personal computer (PC), a desktop computer, mobile device, or any programmable electronic device capable of communicating via network 102. Node 104 and node 106 may be, for example, a host node, a destination node, a target node, an initiator node, or any other type of node within the network fabric. In one embodiment, nodes 104 and 106 may be a storage initiator, a storage target, a database server, a database client, a management server, a web server, or other electronic device or computing system capable of processing program instructions and receiving and sending data. In another embodiment, nodes 104 and 106 may be any hardware component such as a processor, random access memory (RAM) or other hardware components which output data that is then sent to another hardware component.

Switch 116 and switch 118 are computer networking devices which connect devices together on network 102. Switch 116 and switch 118 are substantially similar to one another. Network 102 contains at least one switch. Switches 116 and switch 118 route messages or data from the source to the destination based on routing tables which are populated with forwarding information during startup of network 102 or modifications to network 102, as described below. The routing tables may describe unicast or multicast rules and conform to InfiniBand® Linear Forwarding Table (LFT) or Multicast Forwarding Table (MFT) specifications. In another embodiment, the format, content, and organization of the routing tables in switches 116 and 118 is vendor specific. In another embodiment, switches 116 and 118 are multiport network bridges which use hardware addresses to process and forward data. In other embodiments, switch 116 and switch 118 can also process data at the network layer by additionally incorporating routing functionality. In one embodiment, the size and number of ports of switch 116 and switch 118 may vary. In one embodiment, switches 116 through 118 manage the flow of data across network 102 by transmitting a received message from node 104 or node 106. In another embodiment, switch 116 and switch 118 manage the flow of data across network 102 by exchanging a received message from node 104 to node 106.

Subnet manager 108 and subnet manager 110 are responsible for discovery and configuration of the network 102. Subnet manager 108 and 110 are substantially similar to one another. In the depicted embodiment subnet manager 108 is located on node 104 and subnet manager 110 is located on node 106. In additional embodiments, subnet manager 108 and subnet manager 110 can be located on other nodes.

Subnet manager 108 and subnet manager 110 participate in the election of a master subnet manager by invoking election function 120 and election function 122. Election function 120 and election function 122 send and receive election messages across network 102 to facilitate election of master subnet manager and configuration manager.

The selected master discovers and configures the network and invokes configuration management function 112 and configuration management function 114 to enforce expected configuration. Enforcing configuration may include powering off and powering on switch ports, assigning addresses to end-points, doing miswire tests, implementing switch port phase-out, component test, and phase-in, etc.

Figure 2:
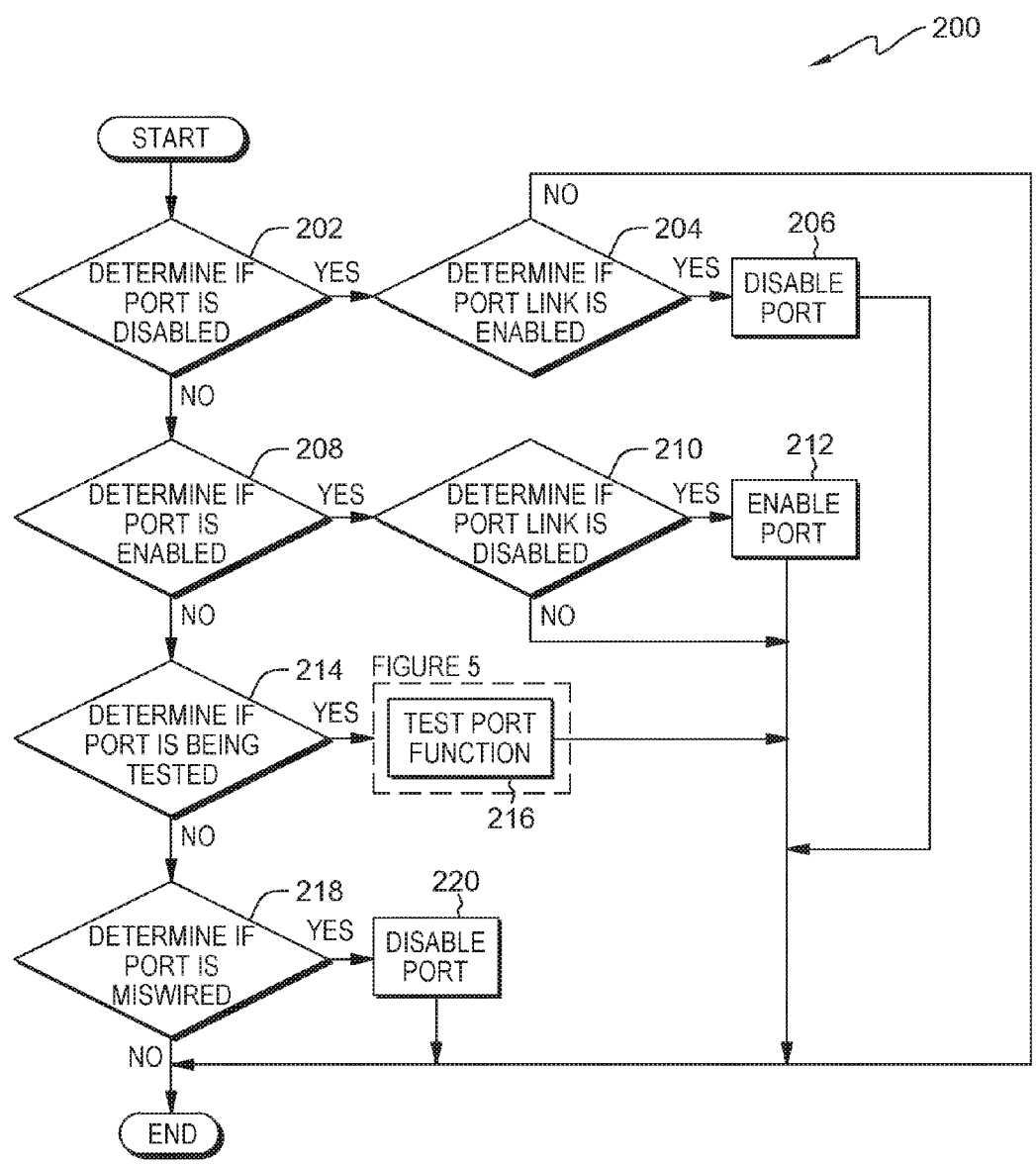
FIG. 2 depicts a flowchart of the operational steps taken by a configuration management function to enforce expected configuration, within the computing environment of FIG. 1, in accordance with one embodiment of the present invention.

FIG. 2 depicts a flowchart 200 of the operational steps taken by a configuration management function to enforce expected configuration, within the computing environment of FIG. 1, in accordance with one embodiment of the present invention. It should be appreciated by one skilled in the art that FIG. 1 provides only an illustration of one implementation and does not imply any limitations with regard to the environments in which different embodiments may be implemented. Many modifications to the depicted environment may be made. The steps performed within flowchart 200 can be performed by either configuration management function 112 or configuration management function 114. In the described embodiment configuration management function 112 is used. Configuration management function 112 is invoked for each port of each discovered switch.

In decision 202, configuration management function 112 determines if the port is expected to be disabled. Configuration management function 112 may implement a configuration option which allows to specify which switch ports are expected to be enabled and which switch ports are expected to be disabled. Turning off unused ports saves power and turning off bad links allows applications to fail over to redundant links. If configuration management function 112 determines the port shall be disabled (yes branch, proceed to decision 204), configuration management function 112 determines if the link is enabled on the port. If configuration management function 112 determines the port shall not be disabled (no branch, proceed to decision 208), configuration management function 112 determines if the port shall be enabled.

In decision 204, configuration management function 112 determines if the port link is enabled. The fabric information obtained during discovery is used to check the state of the link. In one embodiment, configuration management function 112 checks if the port link is enabled by querying the port state using Get( ) method of the SMP PortInfo attribute, and checking whether the physical property of the link is disabled. In another embodiment, simple network management protocol (SNMP) protocol can be used to query the switch port state. In additional embodiments, a vendor application programming interface (API) is used to query the switch. If configuration management function 112 determines the link is enabled (yes branch, proceed to step 206), configuration management function 112 disables the port. If configuration management function 112 determines the link is not enabled (no branch, proceed to END), configuration management function 112 ends the process.

In step 206, configuration management function 112 disables the port. In one embodiment, configuration management function 112 uses Set( ) method of SMP attribute PortInfo to disable the port (setting the physical property of the link to disabled state). In another embodiment, configuration management function 112 uses SNMP protocol to set the switch port state. In yet another embodiment, configuration management function 112 uses a vendor API to set the switch port state.

In decision 208, configuration management function 112 determines if the port is enabled. Configuration management function 112 may implement a configuration option which specifies which switch ports are expected to be enabled and which switch ports are expected to be disabled. If new nodes are added, or bad links are replaced, the relevant switch ports need to be turned on. If configuration management function 112 determines the port shall be enabled (yes branch, proceed to decision 210), configuration management function 112 determines if the port link is disabled. If configuration management function 112 determines that the port shall not be enabled (no branch, proceed to decision 214), configuration management function 112 determines if the port is being tested.

In decision 210, configuration management function 112 determines if port link is disabled. The fabric information obtained during discovery is used to check the state of the link. In one embodiment, configuration management function 112 checks if the port link is disabled, by querying the port state using Get( ) method of the SMP PortInfo attribute, and checking whether the physical property of the link is disabled. In additional embodiments, configuration management function 112 checks if the port link is disabled by using SNMP protocol to query the switch port state. In additional embodiments, configuration management function 112 uses a vendor API to query the switch. If configuration management function 112 determines that the port link is disabled (yes branch, proceed to step 212), configuration management function 112 enables the port. If configuration management function 112 determines that the link is not disabled (no branch, proceed to END), configuration management function 112 ends the process.

In step 212, configuration management function 112 enables port. In one embodiment, configuration management function 112 enables the port using Set( ) method of SMP attribute PortInfo (setting the physical property of the link to enabled state). In additional embodiments, configuration management function 112 uses SNMP protocol to set the switch port state. In additional embodiments, configuration management function 112 uses a vendor API to set the switch port state.

In decision 214, configuration management function 112 determines if the port is being tested. Configuration management function 112 may implement a configuration option to test the switch port. Such test may implement a miswire test and link quality test on new links. Furthermore, component test may query a state of the application on a remote component. Implementing component test allows testing the port and applications behind the port for readiness to operate before the port is moved to ACTIVE state, and thus allows to protect the health of the cluster against non-authorized components, bad links, or run-away applications. If configuration management function 112 determines that the port is being tested (yes branch, proceed to step 216), configuration management function 112 invokes the test port function. If configuration management function 112 determines that the port is not being tested (no branch, proceed to decision 218), configuration management function 112 determines if the port is miswired.

In step 216, configuration management function 112 invokes the test port function. This step is described in greater detail in FIG. 6.

In decision 218, configuration management function 112 determines if port is miswired. Configuration management function 112 may implement a configuration option to specify the expected component which is connected to the switch port. Implementing miswire tests allows configuration management function 112 to protect the health of the cluster against unauthorized components. The identification of discovered components is checked against expected configuration. In one embodiment, configuration management function 112 identifies the component by a remote port globally unique identifier (GUID). In additional embodiments, configuration management function 112 identifies the components using a combination of one or more of the following parameters: node GUID, port GUID, node name, MAC address, vendor ID, serial number, or network address. If configuration management function 112 determines that the port is miswired (yes branch, proceed to step 220), configuration management function 112 disables the port. If configuration management function 112 determines that the port is not miswired (no branch, proceed to END), configuration management function 112 ends the process.

In step 220, configuration management function 112 disables the port. In one embodiment, configuration management function 112 uses Set( ) method of SMP attribute PortInfo to disable the port (setting the physical property of the link to disabled state). In another embodiment, configuration management function 112 uses SNMP protocol to set the switch port state. In yet another embodiment, configuration management function 112 uses a vendor API to set the switch port state. Configuration management function 112 marks the state of the port as failed and adds additional information regarding the reason for the failure.

Figure 3:
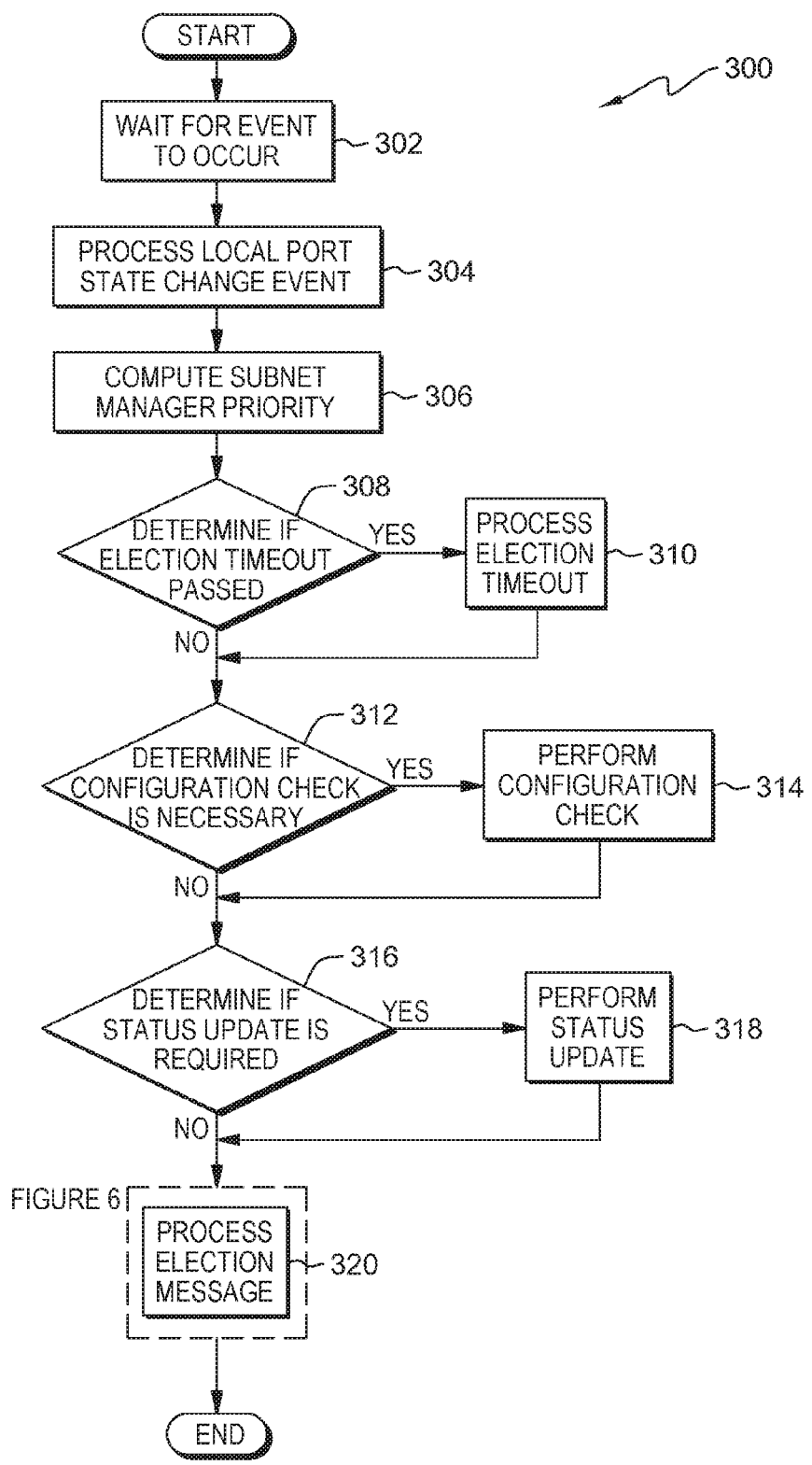
FIG. 3 depicts a flowchart of the operational steps taken by an election function to elect configuration manager, within the computing environment of FIG. 1, in accordance with one embodiment of the present invention.

FIG. 3 depicts a flowchart 300 of the operational steps taken by an election function to elect a configuration manager, within computing environment 100 of FIG. 1, in accordance with one embodiment of the present invention. It should be appreciated by one skilled in the art that FIG. 3 provides only an illustration of one implementation and does not imply any limitations with regard to the environments in which different embodiments may be implemented. Many modifications to the depicted environment may be made. The steps performed within flowchart 300 can be performed by either election function 120 or election function 122. In the described embodiment election function 120 is used.

In step 302, election function 120 waits for an event. The event can be, for example, an election message from another node, external request to change priority, local port state change, or election timeout. Election messages may be, for example, STATUS, TAKEOVER, or CEED and signify status update, request to become master, or request to yield mastership. The subnet manager binds to one or more local ports. These ports are used to send and receive election messages and discover the network fabric. Local port state changes (physical or logical link changes) are interesting because they may affect priority of the local subnet manager. Timers are used to complete or restart election, and can also be used to trigger periodic checks of local ports state. When an event is received, election function 120 sets the event's internal property—status update required—to false value. (The property is examined at decision 316).

In step 304, election function 120 processes the local port state change event. The state change may be of logical or of physical property of the link. In one embodiment, the port state change event is received from host channel adapter (HCA) as asynchronous port state change event and is processed by the election function 120. In additional embodiments, a periodic timer is configured to trigger a port state detection. In additional embodiments, the port state change event has all required information. In additional embodiments, the state of the port needs to be validated after processing the event. In additional embodiments, the state of the port is checked using verbs API and the physical and logical state of the port is examined. In additional embodiments, Get( ) method of SMP PortInfo attribute is used in order to query the port and physical and logical state of the port are looked up in reply. In additional embodiments, only the physical property changes affect priority and only physical state changes are examined. In additional embodiments, both the physical and logical properties affect subnet manager priority and both properties are examined.

In step 306, election function 120 computes subnet manager priority. Election messages exchanged by election functions 120 contain subnet manager priority and the state of subnet manager (MASTER, ELECTING, STANDBY). The highest priority subnet manager wins the election, and elected masters are preferred. The good health state of the local ports shall increase the priority, while bad health state of the local ports shall decrease the priority. Subnet manager 108 or subnet manager 110 with the highest number of ports in good state are preferred to achieve faster and complete discovery of the existing fabric. For example, in the embodiment depicted in FIG. 1, node 104 is preferred if when node 104 links to switch 116 and switch 118 are operational and node 106 has a good link to a single switch. Thus, in the case when links connecting switches 116 and 118 fail, the preferred subnet manager is able to discover all nodes and switches in the network, while node 106 sees a single switch. Furthermore, if network cluster elects the subnet manager to be a configuration manager, the elected configuration manager shall have a highest priority and become master. To satisfy these requirements, a process which computes the priority, shall take into account the health of the ports, the state of subnet manager (whether the subnet manager is master or not), and whether the current subnet manager has been chosen as configuration manager. In one embodiment, the configuration management function can use the following bitmask to compute the priority:

bit-0 is IS_WORKING bit and is always set when subnet manager is operational bit-1 is IS_MASTER bit and is set if subnet manager is current master bit-2 is PORTS_OK bit and is set if all ports are in expected state bit-4 is IS_CONF_MANAGER bit and is set if subnet manager was chosen to be configuration manager.

When using this computation process the elected configuration manager is a preferred master over other subnet manager instances regardless of other parameters in subnet manager. If no running subnet manager is a configuration manager, then the subnet manager with all ports in good state is preferred. If all running subnet managers have the same value of PORTS_OK in the priority, then a running master is preferred.

If compute priority function changes priority of running SM, election function 120 sets its internal property—status update required—to true value.

In decision 308, election function 120 determines if election timeout passed. Each time election is restarted (the state of running subnet manager 108 changes to ELECTING), election timeout is reset to a predefined value. The master subnet manager 108 is expected to be elected within this timeout. Similarly, whenever the state of subnet manager 108 changes to STANDBY, the election timeout is set to another predefined value. Standby subnet manager 108 expects to receive a status message from the current master subnet manager 108 within this timeout. If such message is not received, election is restarted. Each time the standby subnet manager receives a status update from the active subnet manager master, election timeout is reset to the keep-alive master value. Each time a subnet manager becomes master, the subnet manager sets election timeout to yet another value (status update timeout), and uses that value to inform other subnet manager instances of its state.

If election function 120 determines the election timeout has passed (yes branch, proceed to step 310), election function processes the election timeout. If election function 120 does not determine the election timeout passed (no branch, proceed to decision 312), election function 120 determines if a configuration check is necessary.

In step 310, election function 120 processes the election timeout. Election function 120 processes the type of the election timeout. For all types, internal property—status update required—is set to true value. If the state of the running subnet manager is ELECTING, subnet manager 108 is designated as MASTER, and election timeout is set to status update value. If the state if the running subnet manager 108 is master, election timeout is set to status update value. If the state of subnet manager 108 is STANDBY, the state of subnet manager 108 is changed to ELECTING, and election function 120 sets the election timeout to master election timeout value.

In decision 312, election function 120 determines if a configuration check is necessary. During the cold boot of the fabric (when fabric is not completely operational and cluster network services are not able to communicate), elected master subnet manager is not requested to enforce expected configuration. The task of master subnet manager is to bring the network fabric to a coherent state and allow cluster network services and election function 120 to elect a configuration manager. In one embodiment, a cluster network service initiates election of configuration manager when a cluster becomes operational. In additional embodiments, a running master may query the cluster services for permission to do configuration enforcement. In either case, when electing a configuration manager, a present subnet manager master is preferred, unless the present subnet manager master is running on a blacklisted node in the cluster. If the subnet manager master is chosen, the subnet manager master is notified that the subnet manager master is allowed to do configuration enforcement and the subnet manager master remains the active master. If a standby instance is chosen (because present master runs on a blacklisted node or node with a lower priority), the current subnet manager is notified that the current subnet manager is chosen to be configuration manager and the current subnet manager promotes itself to master status by election function because of increased priority. Regardless of receiving configuration election requests from cluster network services, election function 120 implements a periodic check against the state of cluster configuration whether the cluster is allowed to enforce configuration management or not. This configuration check is required when the periodic timer fires (after running instance was promoted as configuration manager), or when the running instance wants to promote itself as configuration manager. If election function 120 determines the configuration check is necessary (yes branch, proceed to step 314), election function 120 performs the configuration check. If election function 120 determines the configuration check is not necessary (no branch, proceed to decision 316), election function 120 determines if status update is required.

In step 314, election function 120 performs a configuration check. In one embodiment, cluster services are contacted for permission to do a configuration check. In additional embodiments, election function 120 uses a periodic check to examine configuration updates from other nodes in the cluster to determine whether the node has been blacklisted or communicated. If configuration updates or communication with cluster services indicate a loss of communication or running node status as black listed, election function 120 is not allowed to enforce configuration management. The configuration check may change the running subnet manager 108 priority (either set or unset the IS_CONF_MANAGER bit). If running the subnet manager priority changes, the status update required property is set to true value.

In decision 316, election function 120 determines if status update is required. Election function 120 uses status update required internal property, to determine whether to send election status or master status updates. If election function 120 determines the status update is required (yes branch, proceed to step 318), election function 120 performs the status update. If election function 120 determines the status update is not required (no branch, proceed to decision 312), election function 120 processes the pending election messages.

In step 318, election function 120 performs a status update. Each status message update includes, for example, the state of the running subnet manager, subnet manager's priority, and subnet manager identification. The type of the status election message is STATUS and signifies status update. Election function 120 may use, for example, node 104 GUID, node 104 name, or other forms of unique identification of node 104 as identification. In one embodiment a broadcast message is sent and is received by all subnet managers in the network. In additional embodiments, the message can be a multicast message. In additional embodiments, other broadcast messages can be used. In additional embodiments, election function 120 has a list of present subnet manager instances and uses unicast communication to each member of the list. In additional embodiments, the list of subnet manager instances is static. In additional embodiments, the list of subnet manager instances is dynamic and is updated during periodic fabric discoveries or though processing trap messages informing about subnet manager presence.

In step 320, election function 120 processes election message. Election function 120 uses election messages to facilitate the election of the master subnet manager. Election messages may be of, for example, of the following types: STATUS, TAKEOVER, or CEED and signify status update, request to become master or request to yield mastership. Processing of these messages is further described in FIG. 6.

Figure 4:
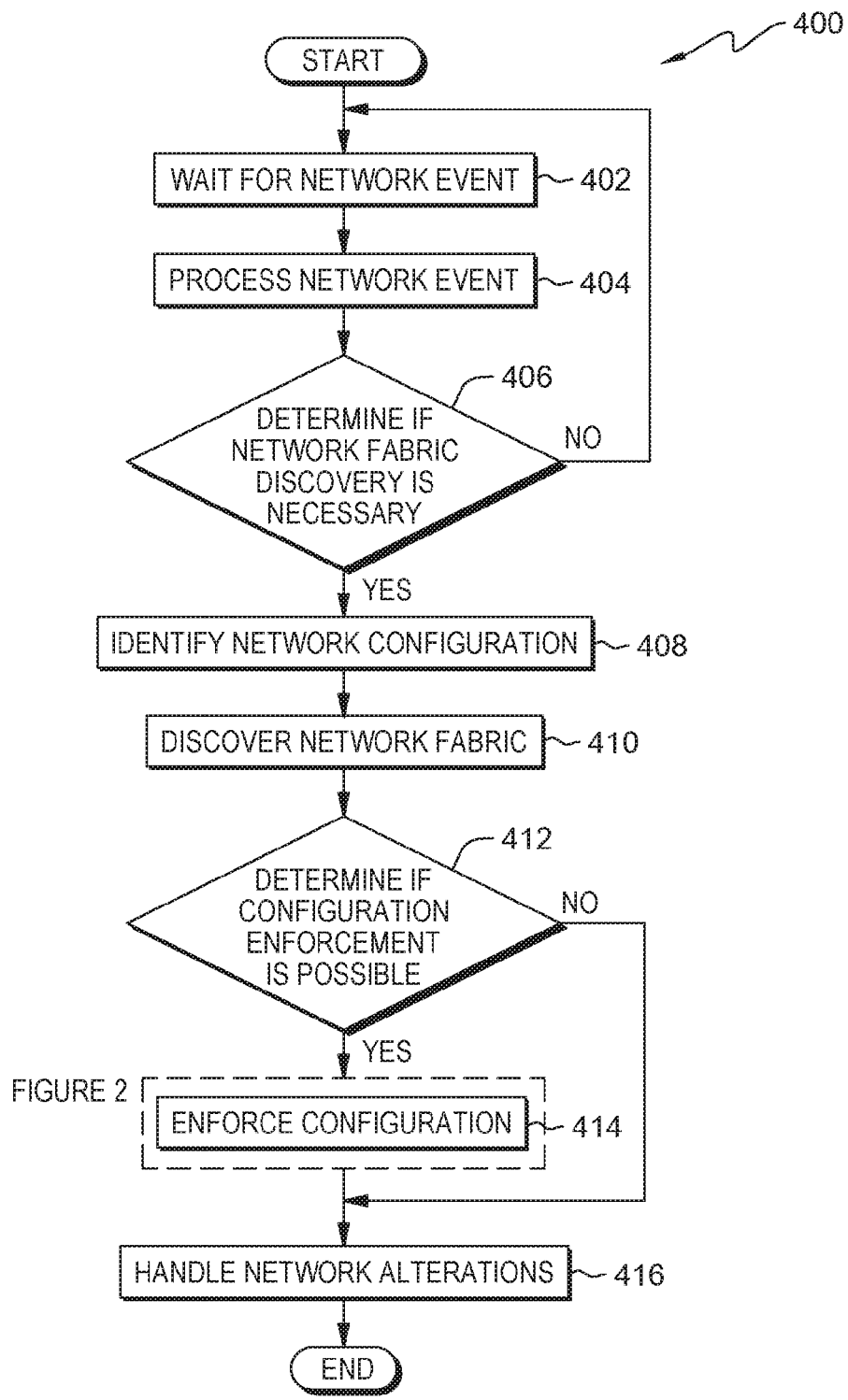
FIG. 4 depicts a flowchart of the operational steps taken by a subnet manager to discover the network and invoke configuration management function, within the computing environment of FIG. 1, in accordance with one embodiment of the present invention.

FIG. 4 depicts a flowchart 400 of the operational steps taken by a subnet manager to discover the network and invoke configuration management function, within the computing environment of FIG. 1, in accordance with one embodiment of the present invention. It should be appreciated by one skilled in the art that FIG. 4 provides only an illustration of one implementation and does not imply any limitations with regard to the environments in which different embodiments may be implemented. Many modifications to the depicted environment may be made. The steps performed within flowchart 400 can be performed by either configuration management function 112 or configuration management function 114. In the described embodiment configuration management function 112 is used.

In step 402, configuration management function 112 waits for network event. In one embodiment, configuration management function 112 waits for network event or the fabric discovery timer. The master of the subnet manager performs periodic discoveries of the network fabric. Discovery can be triggered by a network event (e.g., switch port going up or down or a discovery timer. Discoveries are needed in order to detect changes in the fabric. Configuration management function 112 may use timers for periodic discoveries. In one embodiment, configuration management function 112 discovers network events by receiving appropriate Trap( ) messages from switches 116 or 118. In another embodiment, configuration management function 112 receives a notification from a new node to signal joining the fabric and health monitoring application can send messages about a node leaving the fabric. In other embodiments, configuration management function 112 uses methods specific to the deployed networking environment which are deployed to send and receive events. Other network events can be SA (subnet administration) requests that query internal databases or request multicast management.

In step 404, configuration management function 112 process network events. Configuration management function 112 performs the tasks or required operation related to the network event. In additional embodiments, the actions triggered by a network event may be queued for delayed execution. For example, some SA actions can be delayed by pending fabric discovery.

In decision 406, configuration management function 112 determines if fabric discovery is necessary. Configuration management function 112 determines that the network discovery is needed if processed network events signal a port up or port down, or if a periodic timer for network discovery has fired. If configuration management function 112 determines the fabric discovery is necessary (yes branch, proceed to step 408), configuration management function 112 reads the network configuration. If configuration management function 112 determines the fabric discovery is not necessary (no branch, proceed to step 402), configuration management function 112 waits for network events.

In step 408, configuration management function 112 reads network configuration. In one embodiment, configuration management function 112 recognizes the current configuration update from cluster services. In another embodiment, configuration management function 112 investigates the expected configuration. In additional embodiments, configuration management function 112 gathers information from the network configuration, and compiles a list of all expected switches and the expected state of each switch port (ENABLED, DISABLED, TEST), along with what is expected connected component of each switch port.

In step 410, configuration management function 112 discovers network fabric. Configuration management function 112 can use multiple local ports to speed up the discovery. At first discovery iteration, configuration management function 112 discovers components attached to local ports. If the attached component is not switch 116 or switch 118, discovery does not proceed further. If attached component is switch 116 or switch 118, configuration management function 112 discovers components attached to switch 116 or switch 118 ports during a second iteration. Configuration management function 112 discovers fabric using all local ports of node 104. If switch 116 or switch 118 is found as reachable using more than one local port, configuration management function 112 uses one local port (with the shorter path to the switch) for the switch discovery. Configuration management function 112 repeats the discovery procedures until no new switches are found within the network fabric, at which point discovery of the fabric completes. In additional embodiments, configuration management function 112 performs discovery using direct Infiniband® routing with the help of Get( ) methods of SMP attributes PortInfo, NodeInfo, and SwitchInfo. In additional embodiments, configuration management function 112 uses vendor specific API to query switch 116 or switch 118 topology. In additional embodiments, configuration management function 112 uses SNMP protocol to do the discovery.

In decision 412, configuration management function 112 determines if configuration enforcement is possible. In one embodiment, configuration enforcement is possible if subnet manager 108 has been elected as configuration manager and the last configuration check was successful. If configuration management function 112 determines the configuration enforcement is possible (yes branch, proceed to step 414), configuration management function 112 applies the configuration. If configuration management function 112 determines the configuration enforcement is not possible (no branch, proceed to step 416), configuration management function 112 handles the network alterations.

In step 414, configuration management function 112 enforces configuration. Configuration management function 112 enforces the configuration related to the ports within the network fabric and is invoked for each discovered switch port. Configuration management function 112 enables the ports which shall be enabled according to expected configuration. Ports which shall be disabled according to expected configuration are turned off. Ports that shall be tested, initiate component test. In one embodiment, configuration management function 112 permits miswire checks to be performed. This step is further explained in greater detail in FIG. 2.

In step 416, configuration management function 112 handles network alterations. Configuration management function 112 assigns, for example, addresses, and adds where appropriate to the routing tables the newly discovered components, or the updated components. Configuration management function 112 removes the dead components from the routing tables. Configuration management function 112 may also reset the malfunctioning components.

Figure 5:
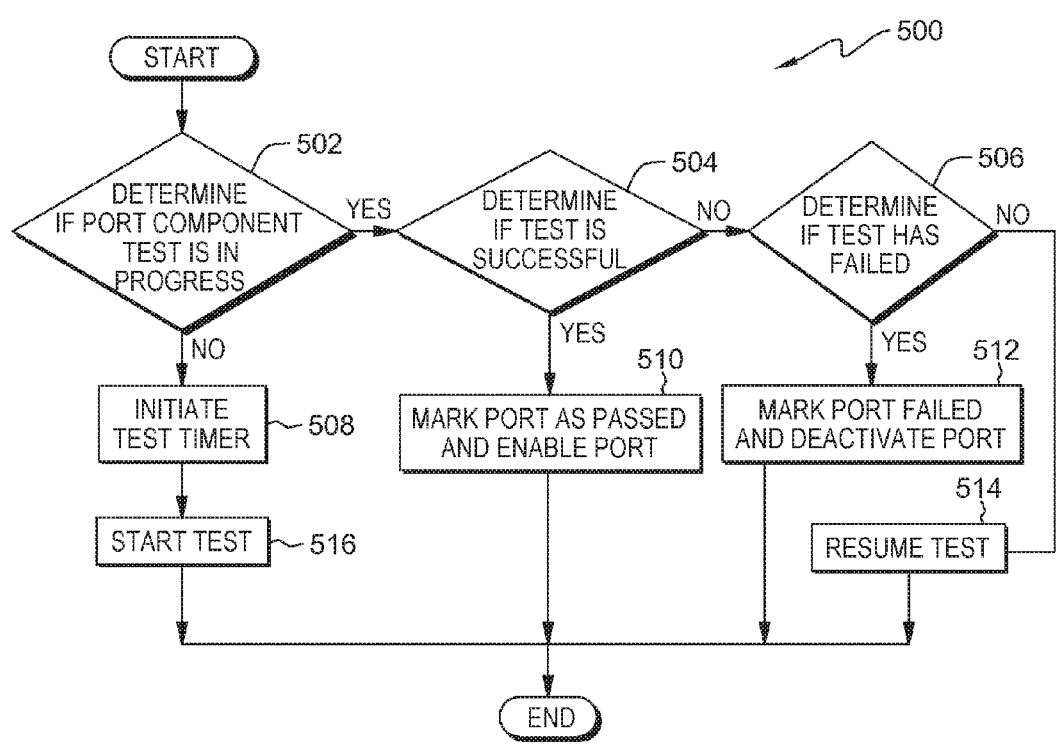
FIG. 5 depicts a flowchart of the operational steps taken by a configuration management function to do a network port component test, within the computing environment of FIG. 1, in accordance with one embodiment of the present invention.

FIG. 5 depicts a flowchart 500 of the operational steps taken by configuration management function 112 to perform a network port component test, within the computing environment of FIG. 1, in accordance with one embodiment of the present invention. It should be appreciated by one skilled in the art that that FIG. 5 provides only an illustration of one implementation and does not imply any limitations with regard to the environments in which different embodiments may be implemented. Many modifications to the depicted environment may be made. The steps performed within flowchart 500 can be performed by either configuration management function 112 or configuration management function 114. In the described embodiment configuration management function 112 is used.

In decision 502, configuration management function 112 determines if the port component test is in progress. In one embodiment, configuration management function 112 implements an option to test a switch port. During the test procedure, the link is turned on and the state of the link (required speed and width) and the quality of the link (whether link shows error during data transfers) can be checked. Additionally, communication with an application running on the node connected to switch port can be attempted to test the health of the node and its software services availability. In additional embodiments, configuration management function 112 performs miswire checks. Component test of the switch port is done before the link of the port is moved to active state and remote component is assigned expected address and allows the health of the network cluster to be protected against bad links, alien components and run-away applications. Testing switch port involves background tasks (like link quality test or application test) and is re-entrant from the point of view of the configuration management function 112. Thus, the test can be in progress or not started. When the background tasks complete, the test is finished with status OK or FAILED. If configuration management function 112 determines the test is in progress (yes branch, proceed to decision 504), configuration management function 112 determines if the test is complete. If configuration management function 112 determines the test is not in progress (no branch, proceed to decision 506), configuration management function 112 initiates the test timer.

In decision 504, configuration management function 112 determines if test is successful. The testing of switch port involves background tasks (like link quality test or application test) and is re-entrant from the point of view of the configuration management function 112. When the background tasks complete, the test is finished with status OK or FAILED. Thus, the test can be in progress or successful. If configuration management function 112 determines the test has completed successfully (yes branch, proceed to step 510), configuration management function 112 marks the port as having passed the test and enables the port. If configuration management function 112 determines the test has not completed successfully (no branch, proceed to decision 506), configuration management function 112 determines if the test has failed.

In decision 506, configuration management function 112 determines if the test has failed. Testing switch port involves background tasks and is re-entrant from the point of view of the configuration management function 112. Thus, the test can be in progress or FAILED. If configuration management function 112 determines the test has failed (yes branch, proceed to step 512), configuration management function 112 marks the port failed and deactivates the port. If configuration management function 112 determines the test has not failed (no branch, proceed to step 514), configuration management function 112 resumes the test.

In step 508, configuration management function 112 initiates the test timer. The component test is supposed to complete within a finite amount of time and failure to perform link test, discovery of a remote component, or communication with the remote application within the defined timeout fails the test. The test timer ensures that the test is to be completed with FAIL status if this condition is not met.

In step 510, configuration management function 112 marks the port as having passed the test and enables the port. Enabling the port may involve assigning the remote component one or more network addresses and joining the switch port to one or more multicast groups. In one embodiment, the addresses are Infiniband® LID addresses. In additional embodiments, addresses can be IP addresses, MAC addresses, or other addresses. In additional embodiments, the Set( ) method of SMP attribute PortInfo is used to assign the addresses and Set( ) method of SMP attribute MulticastForwardingTable is used to join the switch port to multicast groups. In additional embodiments, SNMP protocol is used to assign addresses and configure the switch port. In additional embodiments, vendor defined APIs are used to configure the switches and end-points. In additional embodiments, enabling the port involves moving the link to ACTIVE state and requires routing table updates on the switch. In additional embodiments, the routing table updates are done via Set( ) methods of SMP attributes PortInfo and LinearForwardingTable. In other embodiments SNMP or vendor defined APIs can be used to configure switches and end-points.

In step 512, configuration management function 112 marks that the port failed and deactivates the port. Deactivating the link involves disabling the switch port. In one embodiment the switch port is disabled using Set( ) method of SMP PortInfo attribute. In additional embodiments, vendor APIs or SNMP protocols can be used to set the switch port state.

In step 514, configuration management function 112 resumes the test. If the link presence check is pending, the state of the link is checked using last fabric discovery. If link presence is detected, a miswire check can be started. A miswire check requires remote port to be discovered and match expected identification. The data obtained during the previous discovery is used to do the check. Identification of a remote node can be node GUID, port GUID, node name, MAC address, network address, serial number or any combination of these parameters.

If the miswire check completes, link quality check is started. The link quality check initiates a data transfer to remote node and checks that link state does not change and that errors in the link do not go above defined thresholds. The state of the link is checked against the data returned during the last discovery. The thresholds of the link can be checked using performance counters of the switch port, remote node, or both. The format and meaning of performance counters depends on the network environment deployed. In one embodiment, these are Infiniband® performance counters. In another embodiment, Ethernet port statistics are used. Other embodiments may use other forms of counters.

If link quality check completes, remote application check is started. Remote application check does a network communication with an application on remote node to check its readiness to operate and includes a simple request-response sequence. In one embodiment, request can be Infiniband® MAD packet. In other embodiments, the application check may be an Ethernet frame, IP packet or other type of communication. The test is completed successfully when the reply from the remote application is received and configuration management function 112 matches the reply with expected sequence.

In step 516, configuration management function 112 starts the test. Configuration management function 112 turns on the switch port (configuration management function 112 is not already on as seen during the previous fabric discovery) and various background tasks are started to implement the test. Link presence check requires the link to have required width and speed. Miswire check requires remote component to be discovered and match expected configuration. Link quality check requires that the link remains in required width and speed for a predefined time, and also requires that the link have no errors during initiated data transfer with the remote port. Remote application check requires successful communication with a remote application. Port test tasks are serialized. Link presence check is started first. When link presence test completes, miswire check is started. When miswire check completes, link quality test is started. When link quality test completes, remote application test is started. In one embodiment, all tests are required. In additional embodiments, miswire checks, link quality checks or remote application checks can be omitted. Port test re-entrant from the point of view of the configuration management function 112.

Figure 6:
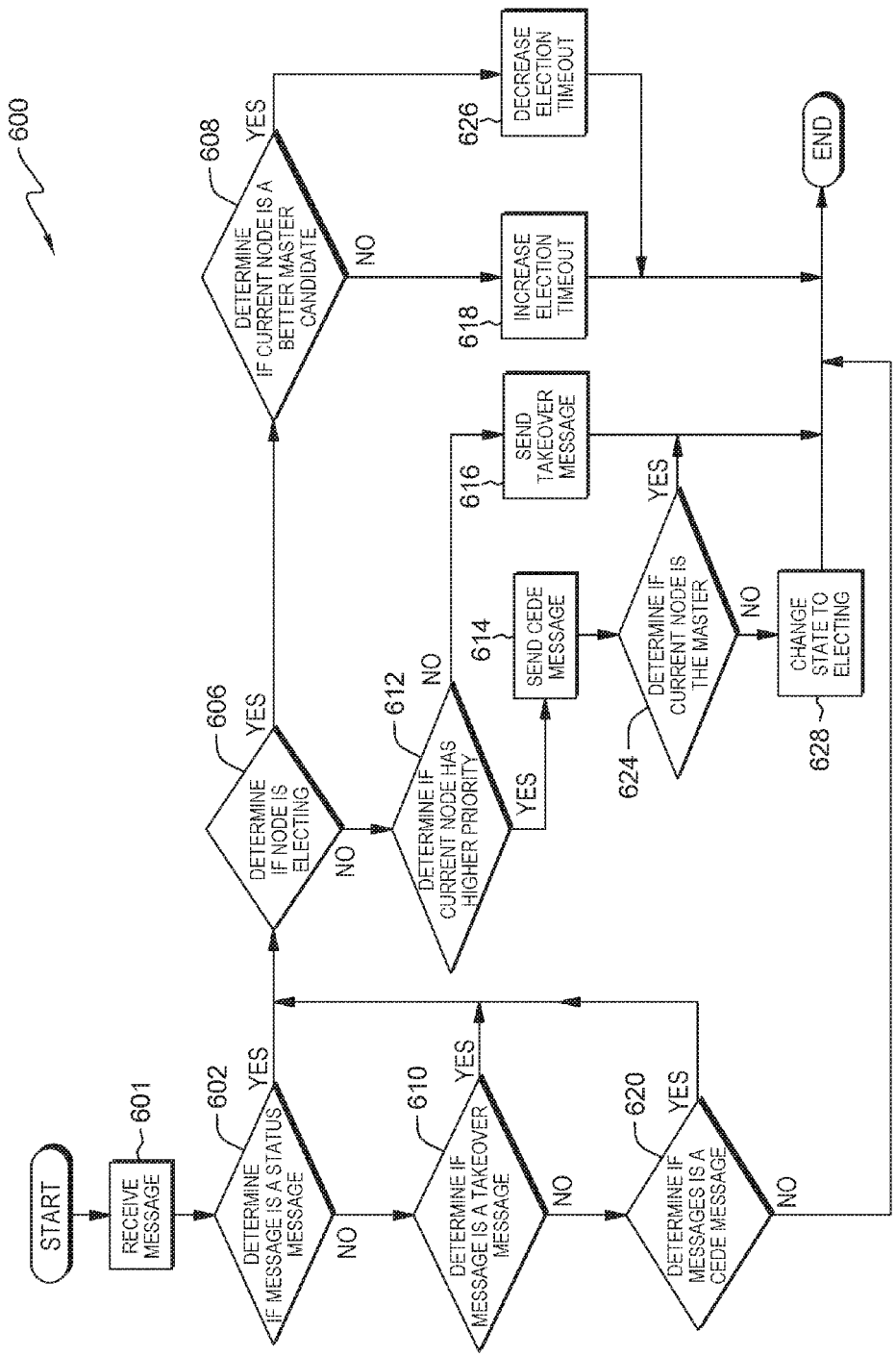
FIG. 6 depicts a flowchart of the operational steps taken by an election function to process election messages, within the computing environment of FIG. 1, in accordance with one embodiment of the present invention.

FIG. 6 depicts a flowchart 600 of the operational steps taken by election function 120 to process election messages, within the computing environment of FIG. 1, in accordance with one embodiment of the present invention. It should be appreciated by one skilled in the art that FIG. 6 provides only an illustration of one implementation and does not imply any limitations with regard to the environments in which different embodiments may be implemented. Many modifications to the depicted environment may be made. The steps performed within flowchart 600 can be performed by either election function 120 or election function 122. In the described embodiment election function 120 is used.

In order to facilitate the election, election function 120 may send election messages of the following types: STATUS, TAKEOVER, or CEED. These types signify status update, request to become master, or request to yield mastership. Each election message contains type, sender identification, sender status (ELECTING, MASTER, STANDBY) and sender priority.

In step 601, election function 120 receives a message. In one embodiment, SMP datagrams are used to receive the message. In additional embodiments, unicast, broadcast or multicast messages that are specific to the network environments deployed are used.

In decision 602, election function 120 determines if the message is a status message. The field type of the message is examined and compared to STATUS value in order to make the check. If election function 120 determines the message is a status message (yes branch, proceed to decision 606), election function 120 determines if the node is in the state ELECTING. If election function 120 determines the message is not a status message (no branch, proceed to decision 610), election function 120 determines if the message is a takeover message.

In decision 606, election function 120 determines if the node is electing. The election state of the each subnet manager is ELECTING, STANDBY or MASTER. If election function 120 determines the node is electing (yes branch, proceed to decision 608), election function 120 determines if the current node is a more appropriate candidate for master. If election function 120 determines the node is not electing (no branch, proceed to decision 612), election function 120 determines if current node has higher priority.

In decision 608, election function 120 determines if the current node is a better master candidate. The current node is a better candidate if the current node has a higher priority. If the sender node of election message has the same priority, a discrimination process which takes the identification of the node is used to determine the better candidate. The same discrimination process is used by a plurality of nodes to ensure that plurality of nodes prefer the same electing candidate if subnet manager 108 or subnet manager 110 priorities are equal, and this allows the election to converge. In one embodiment, the discrimination process can compare node identification (by number or string) and choose a higher value as more preferable. In additional embodiments, the discrimination process may compare node identification (by number or string) and choose a lower value as more preferable. In another embodiment, the discrimination process may have a static prioritized list of identifications and use the list to determine a better candidate. If election function 120 determines the current node is a more appropriate candidate to be master (yes branch, proceed to step 626), election function 120 decreases election timeout. If election function 120 determines the current node is not a more appropriate candidate for master (no branch, proceed to step 618), election function 120 increases election timeout.

In decision 610, election function 120 determines if the message is a takeover message. The type field of the message is examined and compared to TAKEOVER value. If election function 120 determines the message is a takeover message (yes branch, proceed to decision 606), election function 120 determines if the node is electing. If election function 120 determines the message is not a takeover message (no branch, proceed to decision 620), election function 120 determines if message is a cede message.

In decision 612, election function 120 determines if current node has a higher priority. The sender priority field of the message is compared with the priority value of election function 120 (computation of priority is explained in description of FIG. 3 in step 306). If election function 120 determines the current node has higher priority (yes branch, proceed to step 614), election function 120 sends cede message. If election function 120 determines the current node does not have higher priority (no branch, proceed to step 616), election function 120 sends takeover message.

In step 614, election function 120 sends a cede message. In one embodiment SMP datagrams are used to send and receive the messages. In additional embodiments, unicast, broadcast or multicast messages that are specific to the network environments deployed are used.

In step 616, election function 120 sends a takeover message. In one embodiment SMP datagrams are used to send and receive the messages. In additional embodiments, unicast, broadcast or multicast messages that are specific to the network environments deployed are used.

In step 618, election function 120 increases an election timeout. Election function uses election timeout to facilitate election as described in FIG. 3. If election is not completed within the election timeout, the current node becomes master subnet manager. Increasing election timeout when observing that current node is a worse master candidate allows faster election converging while choosing the best candidate. To avoid too large timeouts and competition with run-away master nodes, increase of timeout can be limited to a predefined number of times during election.

In decision 620, election function 120 determines if the message is a cede message. The type field of the message is examined and compared to CEDE value. If election function 120 determines the message is a cede message (yes branch, proceed to decision 606), election function 120 determines if the node is electing. If election function 120 determines the message is not a cede message (no branch, proceed to END), election function 120 ends the process.

In decision 624, election function 120 determine if the current node is the master node. Each subnet manager has election state ELECTING, MASTER, or STANDBY and these states are used by election flow described in FIG. 3. If election function 120 determines the current node is the master node (yes branch, proceed to END), election function 120 ends the process. If election function 120 determines the current node is not the master node (no branch, proceed to decision 312), election function 120 changes the state to electing.

In step 626, election function 120 decreases the election timeout. Election function uses election timeout to facilitate election as described in FIG. 3. If election is not completed within the election timeout, the current node becomes master subnet manager. Decreasing election timeout when observing that current election function is a better master candidate allows faster election converging while choosing the best candidate. To avoid too narrow timeouts, decrease of timeout can be limited to a predefined number of times during election.

In step 628, election function 120 changes the state to electing. Each subnet manager has election state ELECTING, MASTER, or STANDBY and these states are used by election flow described in FIG. 3.

Figure 7:
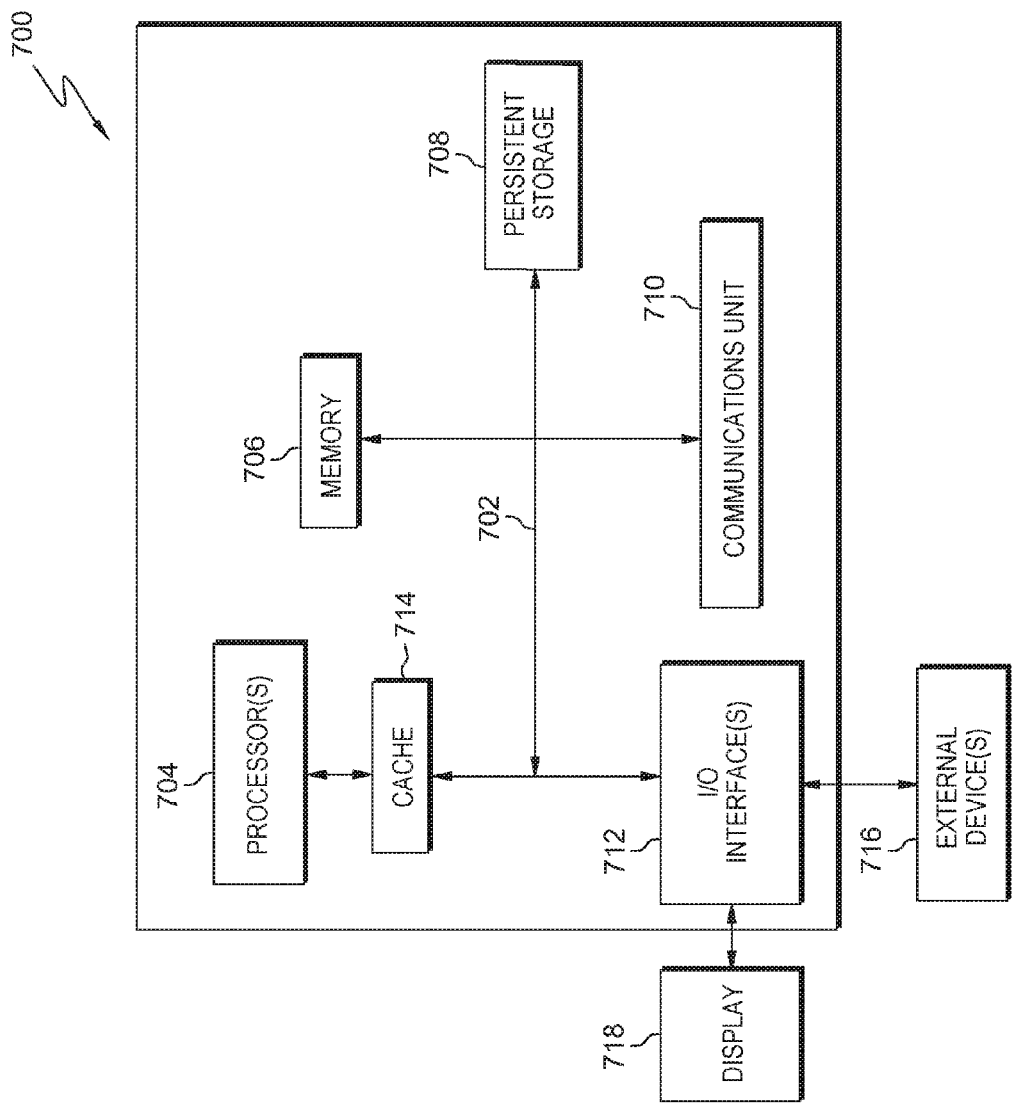
FIG. 7 depicts a block diagram of the internal and external components of the server and the authorized user computing device of FIG. 1, in accordance with one embodiment of the present invention.

FIG. 7 depicts a block diagram 700 of components of node 104, node 106, switch 116, and/or switch 118, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made. It should be appreciated FIG. 7 provides only an illustration of one implementation and does not imply any limitations with regard to the environments in which different embodiments may be implemented. Many modifications to the depicted environment may be made.

Node 104, node 106, switch 116, and switch 118 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any additional hardware components within a system. For example, communications fabric 702 can be implemented with one or more buses.

Memory 706 and persistent storage 708 are computer-readable storage media. In one embodiment, memory 706 includes random access memory (RAM) and cache memory 714. In general, memory 706 can include any suitable volatile or non-volatile computer-readable storage media.

Memory 706 is stored for execution by one or more of the respective computer processors 704 of node 104, node 106, switch 116, and switch 118 via one or more memories of memory 706 of node 104, node 106, switch 116, and switch 118. In the depicted embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in the examples, provides for communications with other data processing systems or devices, including node 104, node 106, switch 116, and switch 118. In the examples, communications unit 710 includes one or more network interface cards. Communications unit 710 may provide communications through the use of either or both physical and wireless communications links.

I/O interface(s) 712 allows for input and output of data with other devices that may be connected to node 104, node 106, switch 116, and switch 118. For example, I/O interface 712 may provide a connection to external devices 716 such as a keyboard, keypad, camera, a touch screen, and/or some other suitable input device. External devices 716 can also include portable computer-readable storage media such as, for example, thumb drives, portable optical or magnetic disks, and memory cards. Software and data used to practice embodiments of the present invention, e.g., configuration management function 112, configuration management function 114, election function 120, election function 122, subnet manager 108, and subnet manager 110, can be stored on such portable computer-readable storage media and can be loaded onto persistent storage 708 of node 104, node 106, switch 116, and switch 118 via I/O interface(s) 712 of node 104, node 106, switch 116, and switch 118. Software and data used to practice embodiments of the present invention, e.g., statistical machine translation program 108 can be stored on such portable computer-readable storage media and can be loaded onto persistent storage 708 of node 104, node 106, switch 116, and switch 118 via I/O interface(s) 712 of node 104, node 106, switch 116, and switch 118. I/O interface(s) 712 also connect to a display 718.

Display 718 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for election of a managing node for a network, the method comprising:
   detecting, by one or more processors, that a first set of background tasks is not running, wherein the first set of background tasks are re-entrant and have not failed;
   identifying, by the one or more processors, at least a first node in a network and information about the first node, wherein the first node is capable of performing the first set of background tasks, determined, at least in part by information associated with the first node;
   confirming, by the one or more processors, the first node has an expected configuration;
   comparing, by the one or more processors, the information about the first node to information about other nodes of a plurality of nodes within the network;
   based on the comparison of the first node to the plurality of nodes electing, by one or more processors, the first node as the managing node in the network to perform the first set of background tasks,
   identifying, by the managing node, a first plurality of components of the network;
   detecting, by the managing node, miswiring between at least two components of the first plurality of components of the network;
   configuring, by the managing node, the network to correct the miswiring;
   comparing, by the managing node, the first plurality of components of the network to a past configuration of a second plurality of components of the network;
   based on the comparison of the first plurality of components to a past configuration determining, by the managing node, a change to the power status of the first plurality of components;
   controlling, by the managing node, power to the first plurality of components of the network, wherein controlling the power comprises switching the power to the component on and switching the power to the component off, such that, at least, if a component of the first plurality of components is not in use, the power to the component is switched off;
   performing, by one or more processors, the first set of background tasks by the first node to the first plurality of components within the network comprising:
      selecting, by the one or more processors, a second node of the network as an elector, wherein the elector controls the selection process for a node within the network to perform the first set of management tasks;
      providing, by the one or more processors, the second node with the information about the other nodes of the plurality of nodes within the network;
      electing, by the one or more processors, a node of the plurality of nodes based on the information about the plurality of nodes;
      detecting, by the one or more processors, the first node failed to perform at least one management task of the first set of management tasks; and
      electing, by the one or more processors, a second node as a second managing node in the network to perform the first set of management tasks.

* * * * *